US011970010B2

(12) United States Patent
Lum et al.

(10) Patent No.: US 11,970,010 B2
(45) Date of Patent: Apr. 30, 2024

(54) PRINTHEAD WITH CIRCULATION CHANNEL

(71) Applicant: Hewlett-Packard Development Company, L.P., Spring, TX (US)

(72) Inventors: Jacob Lum, Corvallis, OR (US); James A. Feinn, San Diego, CA (US); Mengqian Lu, San Diego, CA (US); Garrett E. Clark, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 161 days.

(21) Appl. No.: 17/772,760

(22) PCT Filed: Nov. 13, 2019

(86) PCT No.: PCT/US2019/061319
§ 371 (c)(1),
(2) Date: Apr. 28, 2022

(87) PCT Pub. No.: WO2021/096504
PCT Pub. Date: May 20, 2021

(65) Prior Publication Data
US 2022/0379627 A1 Dec. 1, 2022

(51) Int. Cl.
*B41J 2/18* (2006.01)

(52) U.S. Cl.
CPC ....................................... *B41J 2/18* (2013.01)

(58) Field of Classification Search
CPC ... B41J 2/18; B41J 2/5054; B41J 2/512; B41J 2202/12
See application file for complete search history.

(56) References Cited

U.S. PATENT DOCUMENTS

| | | | | |
|---|---|---|---|---|
| 7,131,555 | B2 | 11/2006 | Maruyama et al. | |
| 7,416,273 | B2 | 8/2008 | Kusunoki | |
| 7,735,962 | B2 | 6/2010 | Matsumoto et al. | |
| 9,340,015 | B2 | 5/2016 | Sudo et al. | |
| 2006/0066655 | A1 | 3/2006 | Richard et al. | |
| 2008/0024574 | A1 | 1/2008 | Donaldson et al. | |
| 2008/0204533 | A1 | 8/2008 | Nathan et al. | |
| 2009/0059248 | A1 | 3/2009 | Uemura et al. | |
| 2013/0076835 | A1* | 3/2013 | Oikawa | B41J 2/1404 347/54 |

(Continued)

FOREIGN PATENT DOCUMENTS

| | | | |
|---|---|---|---|
| CN | 101495318 | A | 7/2009 |
| CN | 107206807 | A | 9/2017 |

(Continued)

*Primary Examiner* — Scott A Richmond
(74) *Attorney, Agent, or Firm* — Foley & Lardner LLP

(57) ABSTRACT

An example printhead includes a circulation channel having an inlet for receiving a fluid and an outlet for expelling the fluid, a first nozzle fluidically coupled to the circulation channel, the first nozzle being operable at a first absolute pressure, and a second nozzle fluidically coupled to the circulation channel, the second nozzle being operable at a second absolute pressure, the absolute second pressure being lower than the first absolute pressure. The absolute pressure in the circulation channel decreases as the fluid flows from the inlet to the outlet, and the first nozzle is positioned closer to the inlet of the circulation channel than the second nozzle.

15 Claims, 6 Drawing Sheets

(56) References Cited

U.S. PATENT DOCUMENTS

| | | | |
|---|---|---|---|
| 2017/0368838 A1 | 12/2017 | Ross et al. | |
| 2018/0050544 A1* | 2/2018 | Suzuki | B41J 19/147 |
| 2018/0215148 A1 | 8/2018 | Govyadinov et al. | |
| 2018/0290458 A1* | 10/2018 | Govyadinov | B41J 2/18 |

FOREIGN PATENT DOCUMENTS

| | | |
|---|---|---|
| JP | 2012-101415 A | 5/2012 |
| WO | 2016/175812 A1 | 11/2016 |

* cited by examiner

PRINTHEAD WITH CIRCULATION CHANNEL

BACKGROUND

Printers are commonplace in both home environments and office environments. Such printers can include laser printers, inkjet printers or other types of printers. Generally, inkjet printers include printheads which deposit marking fluids, such as ink, onto a print medium, such as paper. The printheads may move across the width of the print medium to selectively deposit ink to produce the desired image. Inkjet printers create images from digital files by propelling droplets of ink onto paper or other materials. The droplets are deposited from nozzles in the printhead as the printhead traverses a print carriage while the paper is advanced.

BRIEF DESCRIPTION OF THE DRAWINGS

For a more complete understanding of various examples, reference is now made to the following description taken in connection with the accompanying drawings in which.

DETAILED DESCRIPTION

Various examples described herein relate to printheads that can provide improved print quality and ink flux through a recirculation, or circulation, channel, through the firing chamber. An example printhead is provided with at least two different types of nozzles, high drop weight (HDW) nozzles and low drop weight (LDW) nozzles. HDW nozzles have a larger exit area and eject fluid (e.g., ink) at a higher absolute pressure than the LDW nozzles which have a smaller exit area. In different examples, the different nozzles are positioned at different places along the circulation channel to take advantage of the different absolute pressure along the channel. In one example, an array of HDW nozzles is placed upstream of the LDW nozzles, thus improving nozzle flux by aligning the absolute pressure along the channel to the absolute pressure associated with the particular nozzles. In other examples, arrays of nozzles are provided with a combination of HDW and LDW nozzles.

Figure 1:
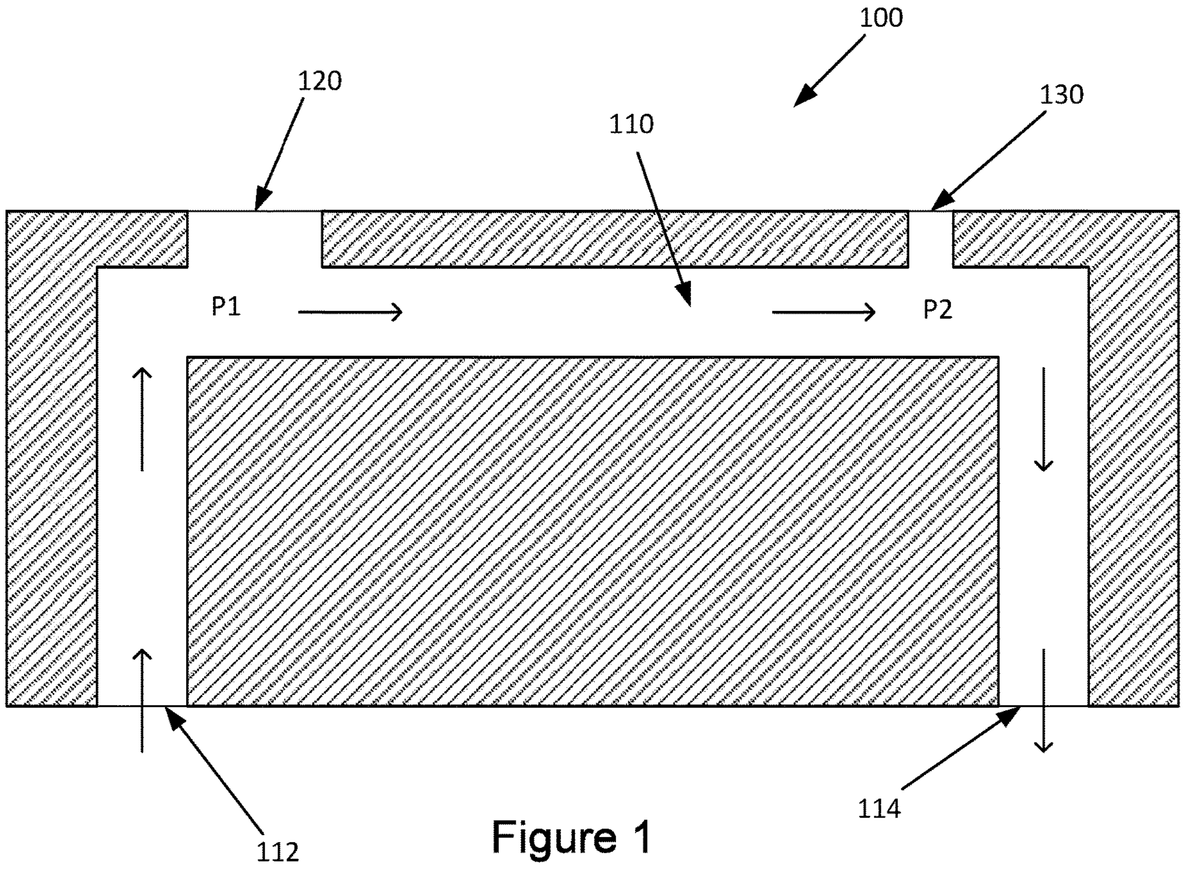
FIG. 1 illustrates a cross-sectional side view of an example printhead.

Referring now to FIG. 1, a cross-sectional side view of an example printhead is illustrated. The example printhead 100 may be formed of any of a variety of materials. In one example, the printhead 100 is formed as a fluidic die with layers of materials such as silicon. The example printhead 100 of FIG. 1 is formed with a circulation channel 110 through which fluid, such as ink, can be flowed. The circulation channel 110 can be coupled to a fluid reservoir (not shown in FIG. 1) from which the fluid is directed into the circulation channel 110. In some examples, the circulation channel 110 is a recirculation channel through which the fluid can be redirected to the fluid reservoir.

The fluid is received into the circulation channel 110 through an inlet 112 and expelled through an outlet 114. The inlet 112 and the outlet 114 may be coupled to the fluid reservoir. Other components, such as pumps, and pressure regulators, may be provided to facilitate fluid flow from the fluid reservoir through the circulation channel 110. In the example illustrated in FIG. 1, the fluid flows through the circulation channel 110 from the inlet 112 to the outlet 114, as indicated by the arrows within the circulation channel 110.

The example printhead 100 of FIG. 1 includes a first nozzle 120 and a second nozzle 130. Each of the first nozzle 120 and the second nozzle 130 is fluidically coupled to the circulation channel 110. Thus, as fluid flows through the circulation channel 110, the fluid may be ejected via the nozzles 120, 130 onto, for example, a print medium.

As the fluid flows through the circulation channel 110, the absolute pressure of the fluid decreases. The decrease in absolute pressure may be due to a variety of reasons, including losses due to friction, compression of the fluid, or release of fluid through nozzles 120, 130. In the example illustrated in FIG. 1, the first nozzle 120 is upstream relative to the second nozzle 130. In this regard, the first nozzle 120 is positioned closer to the inlet 112 than the second nozzle 130 and, correspondingly, the second nozzle 130 is positioned closer to the outlet 114 than the first nozzle 120. Thus, the absolute pressure at the first nozzle 120 (P1) is greater than the absolute pressure at the second nozzle 130 (P2).

Different types of nozzles may be provided at various positions along the circulation channel based on the varying absolute pressure. In the example of FIG. 1, the first nozzle 120 may be a nozzle that is operable at a higher absolute pressure (e.g., P1), while the second nozzle 130 may be a nozzle that is operable at a lower absolute pressure (e.g., P2).

Figure 2:
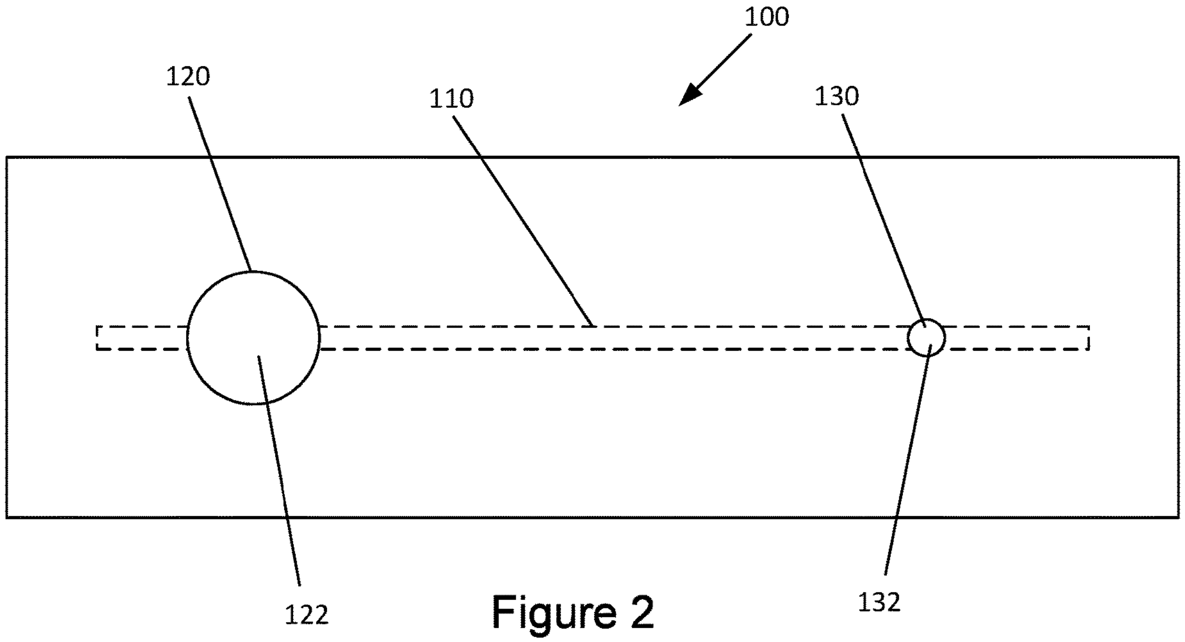
FIG. 2 illustrates a top view of the example printhead of FIG. 1.

In this regard, the first nozzle 120 may be provided with a larger exit area than the second nozzle 130, as illustrated in the top view of FIG. 2. The larger exit area 122 of the first nozzle can also allow for a greater print flux flow rate of the fluid than the smaller exit area 132 of the second nozzle 130. It is noted that, while FIGS. 1 and 2 illustrate an example printhead with two nozzles 120, 130, other examples may include a greater number of nozzles coupled to the circulation channel 110.

Figure 3A:
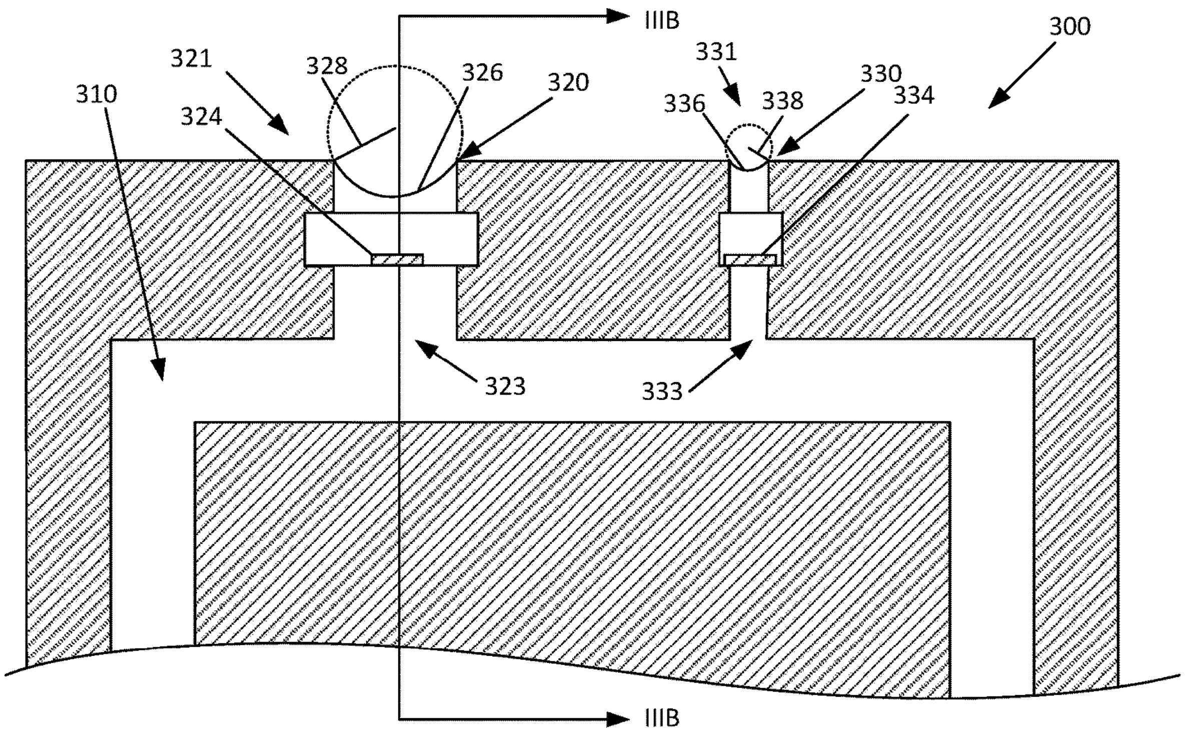
FIG. 3A illustrates a cross-sectional side view of another example printhead.
Figure 3B:
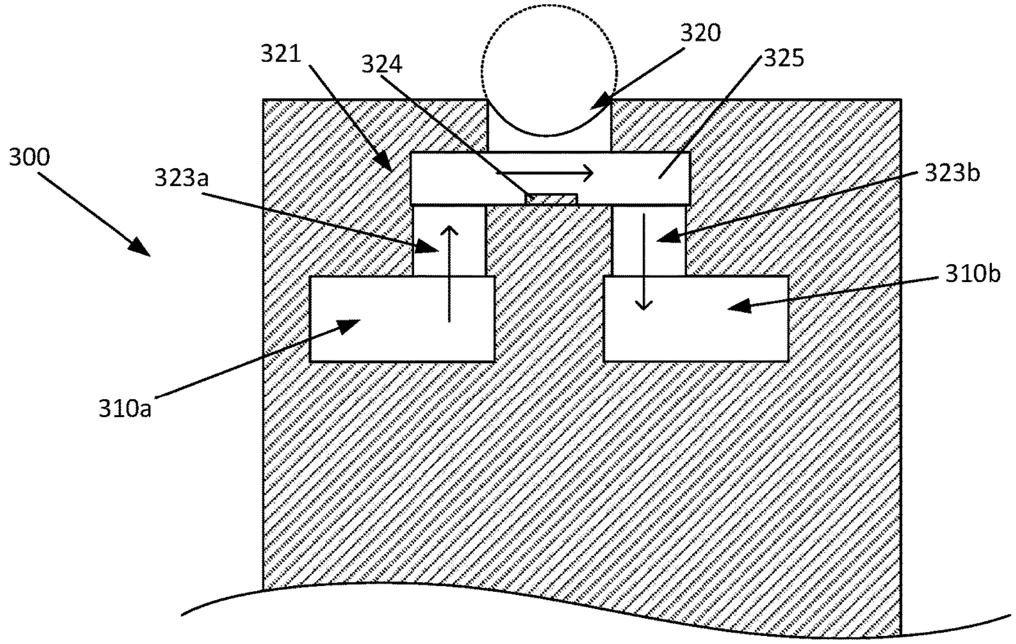
FIG. 3B is a cross-sectional view taken along IIIB-IIIB of FIG. 3A.

Referring now to FIGS. 3A and 3B, FIG. 3A provides a cross-sectional side view of another example printhead to illustrate the different types of nozzles. Further, FIG. 3B is a cross-sectional view taken along IIIB-IIIB of FIG. 3A to illustrate an example fluidic coupling. The example printhead 300 of FIGS. 3A and 3B is similar to the example printhead 100 described above with reference to FIG. 1 and includes a circulation channel 310, a first nozzle 320 and a second nozzle 330. Each nozzle 320, 330 is provided with a fluidic coupling 321, 331 to direct the fluid from the circulation channel 310 to the respective nozzle. Each fluidic coupling 321, 331 includes a corresponding actuator 324, 334 to selectively eject the fluid through the nozzle 320, 330. In various examples, the actuator 324, 334 may be a thermal ink jet (TIJ) resistor, a piezoelectric element or any of a variety of other types of actuators. The example fluidic coupling 321 is described further below with reference to FIG. 3B.

FIG. 3A illustrates an example association between the exit area of the nozzles 320, 330 and the absolute pressure at which fluid is ejected through the nozzles 320, 330. Each nozzle 320, 330 is illustrated with a corresponding meniscus 326, 336. FIG. 3A illustrates that each meniscus 326, 336 has a corresponding meniscus radius of curvature 328, 338 which is determined by the nozzle shape cross-sectional area, and difference between the atmospheric pressure and pressure in the firing chamber. The expressed relationship illustrates that nozzles designs that yield lower radius of curvature (LDW) can be operated at lower absolute pressures in the firing chamber than nozzles with greater radius of curvature (HDW) before print quality is degraded or the nozzle de-primes:

$$P_{atmosphere}-P_{firing\ chamber}=2^{*}(\text{surface tension})/(\text{meniscus radius of curvature})$$

Thus, nozzles with larger exit areas (e.g., the first nozzle 320) are operable at higher absolute pressure, while nozzles with smaller exit areas (e.g., the second nozzle 330) are operable at lower absolute pressure. Further, with the larger exit area, the first nozzle 320 ejects larger drops of fluid and is, therefore, referred to as a high drop weight (HDW) nozzle. Similarly, the second nozzle 330 ejects smaller drops of fluid and is referred to as a low drop weight (LDW) nozzle. Further, with the different exit areas, fluid is ejected from the HDW nozzles at a greater flow rate than the LDW nozzles.

Referring now to FIG. 3B, an example fluidic coupling is illustrated. The example fluidic coupling 321 illustrated in FIG. 3B couples the circulation channel 310 to the HDW nozzle 320 of FIG. 3A. In the example of FIG. 3B, the circulation channel 310 is illustrated as two sub-channels 310*a*, 310*b*. In other examples. The sub-channels 310*a*, 310*b* may be adjacent circulation channels in a series of channels formed in the printhead. Flow in the adjacent channels, or the sub-channels 310*a*, 310*b*, is in opposite directions. For example, in the example of FIG. 3B, flow in the first sub-channel 310*a* is into the paper, while flow in the second sub-channel 310*b* is out of the paper. In other examples, the flow in the sub-channels 310*a*, 310*b* may be in the same direction.

Fluid is directed from the first sub-channel 310*a* through a first feed hole 323*a*, as indicated by the upward arrow in FIG. 3B. The first feed hole 323*a* is in fluid communication with a fluid restrictor 325 through which the fluid is flowed past the actuator 324. Selective operation of the actuator 324 causes fluid to be ejected from the nozzle. Fluid that is not ejected is directed through the fluid restrictor 325 to a second feed hole 323*b* and into the second sub-channel 310*b*. FIG. 3A illustrates a feed hole 323 associated with the HDW nozzle 320 and a similar feed hole 333 associated with the LDW nozzle 330.

Figure 4:
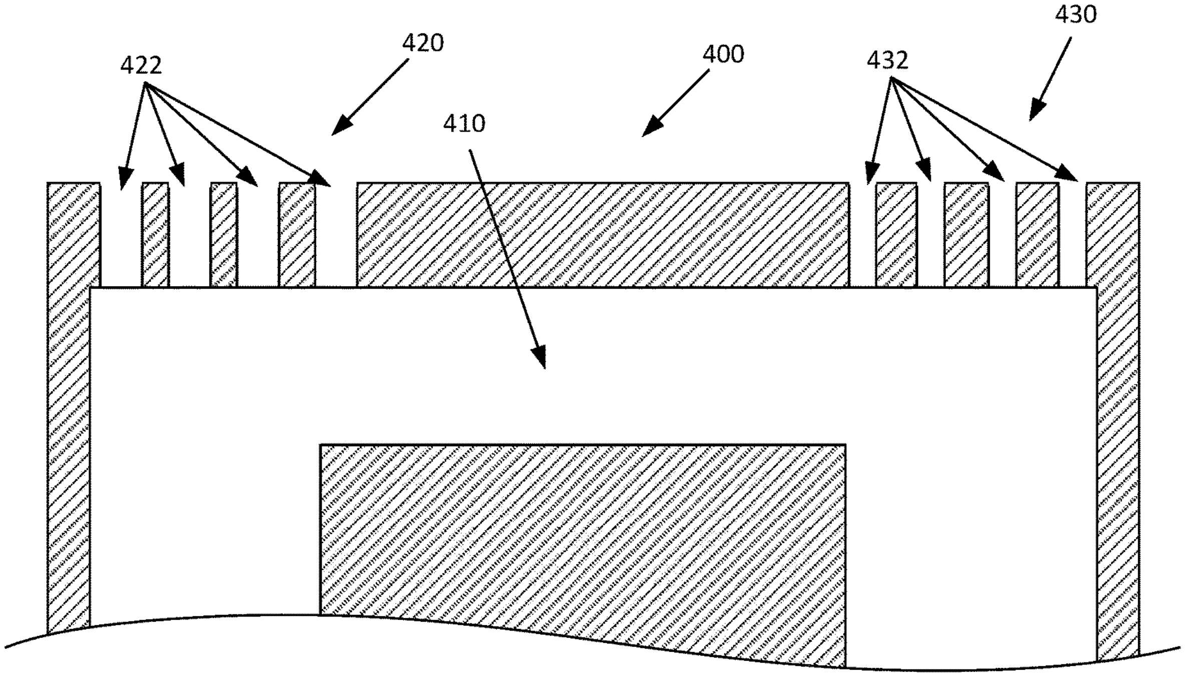
FIG. 4 illustrates a cross-sectional side view of another example printhead.

Referring now to FIG. 4, a cross-sectional side view of another example printhead is illustrated. The example printhead 400 of FIG. 4 is similar to the example printheads described above and includes a circulation channel 410 by which a fluid, such as ink, can flow through the printhead. The example printhead 400 of FIG. 4 is provided with a first array of nozzles 420 and a second array of nozzles 430. Each array of nozzles 420, 430 includes a respective set of nozzles 422, 432 through which the fluid can be ejected onto a print medium.

Figure 5:
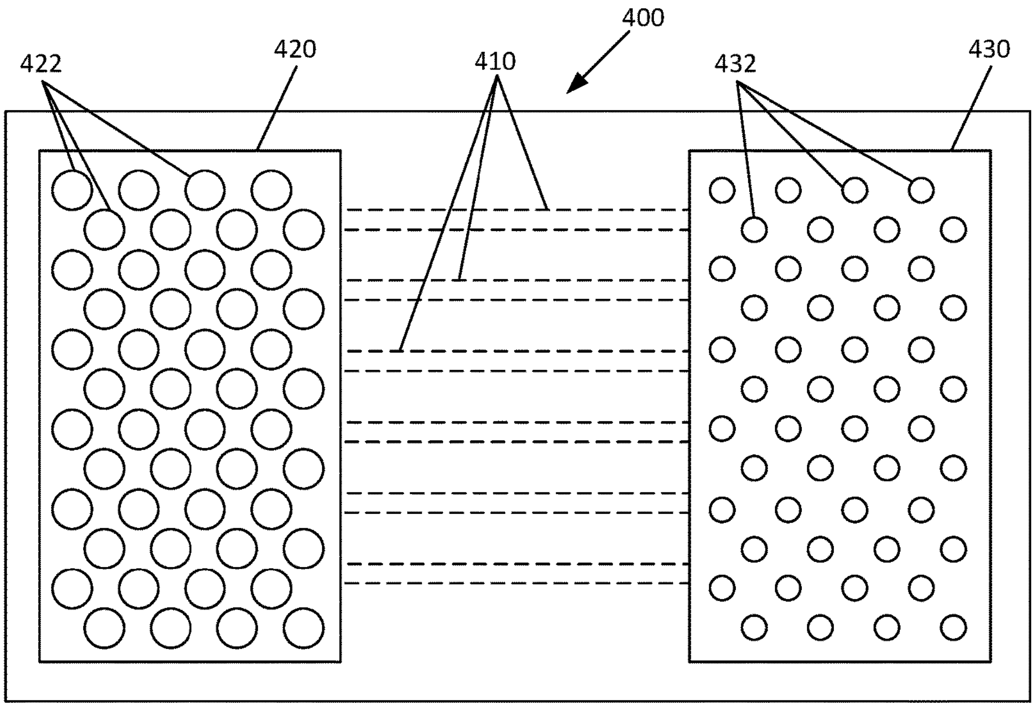
FIG. 5 illustrates a top view of the example printhead of FIG. 4.

FIG. 5 illustrates a top view of the example printhead 400 of FIG. 4. As illustrated in FIG. 5, the circulation channel 410 may include multiple channels coupled to the first nozzle array 420 and the second nozzle array 430. In some examples, each nozzle 422, 432 in the arrays 420, 430 is coupled to one of the circulation channels 410. In other examples, each array 420, 430 may include additional channels within each array to distribute the fluid from the circulation channels 410 to each nozzle 422, 432 in the array 420, 430.

In the example printhead 400 of FIG. 4, each nozzle array 420, 430 is provided with a corresponding type of nozzle. For example, each of the nozzles 422 in the first nozzle array 420 is a high drop weight nozzle with the larger exit area, while each of the nozzles 432 in the second nozzle array 430 is a low drop weight nozzle.

The direction of the flow through the circulation channels may be provided in either direction. In one example, the fluid may be flowed from left to right in FIG. 5. In this regard, the first nozzle array 420 with the HDW nozzles is provided at a position corresponding to a higher absolute pressure in the circulation channels 410, while the second nozzle array 430 with the LDW nozzles is provided at a position corresponding to the lower absolute pressure in the circulation channels. Flow of the fluid in this direction may be desired for a first print quality for high flux printing with fluid recirculation when the HDW print flux is higher than the LDW print flux demand (e.g., faster, higher-quality print).

In another example, the fluid may be flowed from right to left in FIG. 5. In this regard, the first nozzle array 420 with the HDW nozzles is provided at a position corresponding to a lower absolute pressure in the circulation channels 410, while the second nozzle array 430 with the LDW nozzles is provided at a position corresponding to the higher absolute pressure in the circulation channels. In these positions, flow through the second nozzle array 430 (with LDW nozzles) may be increased, while decreasing or eliminating flow through the first nozzle array 420 (with HDW nozzles). Flow of the fluid in this direction may be used to provide higher print quality when the LDW print flux is higher than the HDW print flux demand.

Figure 6:
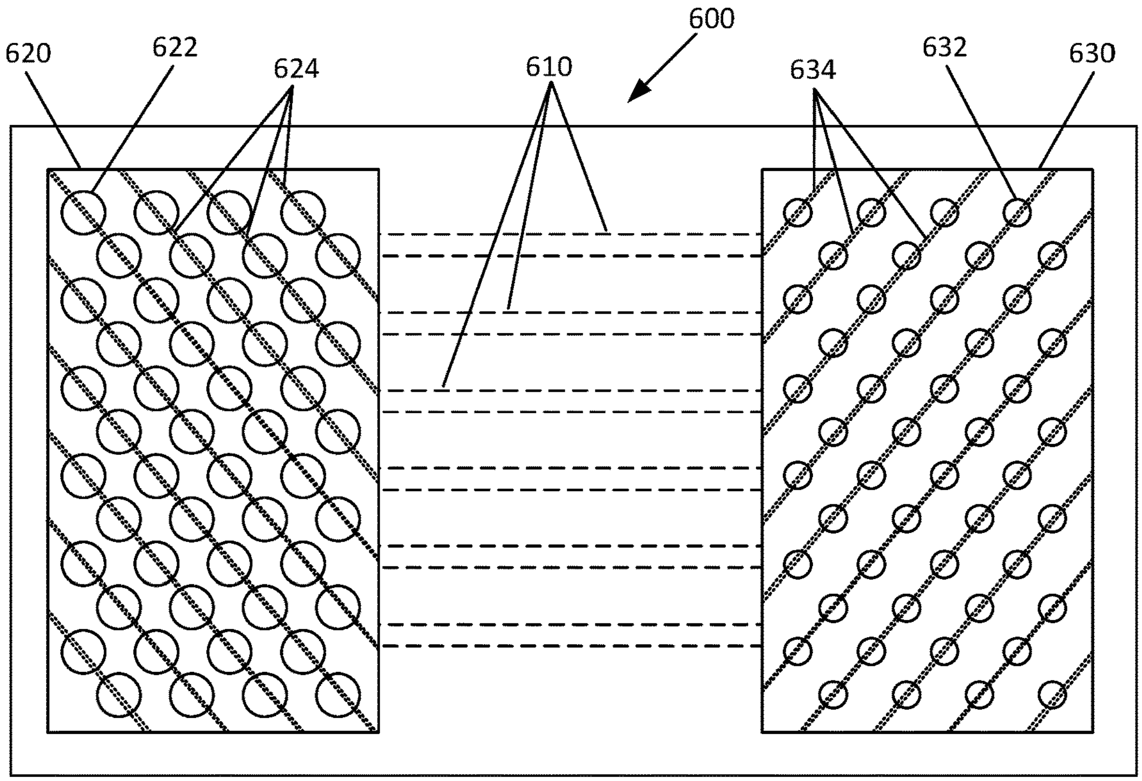
FIG. 6 illustrates a top view of another example printhead.
Figure 7:
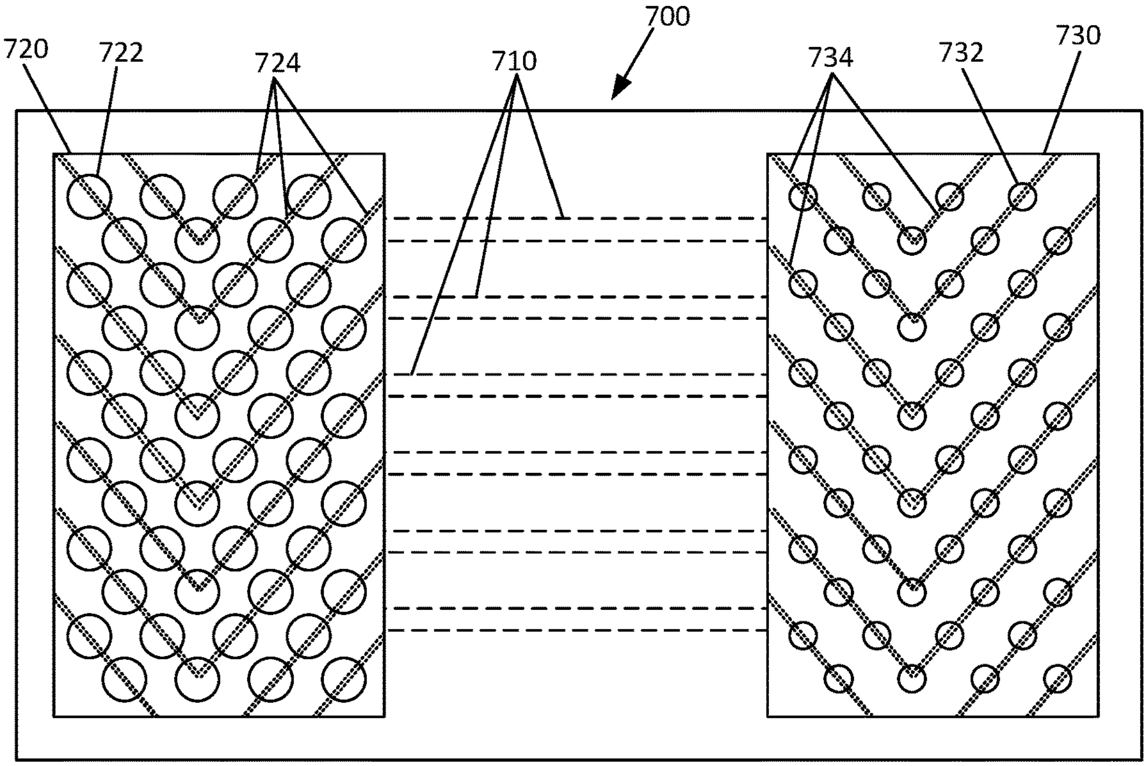
FIG. 7 illustrates a top view of another example printhead.

As noted above, in some examples, each nozzle array 420, 430 may include additional channels within each array to distribute the fluid from the circulation channels 410 to each nozzle 422, 432 in the nozzle array 420, 430. FIGS. 6 and 7 illustrates examples of such printheads.

Referring first to FIG. 6, a top view of another example printhead is provided. The example printhead 600 is similar to the example printhead 400 described above with reference to FIGS. 4 and 5 and includes circulation channels 610, a first nozzle array 620 with nozzles 622, and a second nozzle array 630 with nozzles 632. Each of the nozzle arrays 620, 630 is provided with internal channels 624, 634 that are coupled to the circulation channels 610. Each of the nozzles 622, 632 in the nozzle arrays 620, 630 is coupled to an internal channel 624, thus providing fluid from the circulation channels 610 to each nozzle 622, 632. As illustrated in FIG. 6, the internal channels 624, 634 are formed in opposing diagonals, thus forming chevrons across the first nozzle array 620 and the second nozzle array 630. In some examples, the internal channels 624, 634 may be similar to the sub-channels 310*a*, 310*b* described above with reference to FIG. 3B. In this regard, each nozzle 622, 632 may be coupled to two adjacent internal channels 624, 634. Further, in this arrangement, the nozzles 622, 632 may facilitate flow of the fluid between the internal channels.

FIG. 7 illustrates a similar example printhead 700 to the example printhead 600 of FIG. 6. In the regard, the example printhead 700 of FIG. 7 is provided with circulation channels 710 and nozzle arrays 720, 730 with respective nozzles

722, 732, with each nozzle array 720, 730 having internal channels 724, 734, respectively. In the example of FIG. 7, the internal channels 724, 734 form chevrons within each nozzle array 720, 730. Again, as described above with reference to FIG. 6, the internal channels 724, 734 may be similar to the sub-channels 310*a*, 310*b* described above with reference to FIG. 3B. Thus, each nozzle 722, 732 may be coupled to two adjacent internal channels 724, 734.

Figure 8:
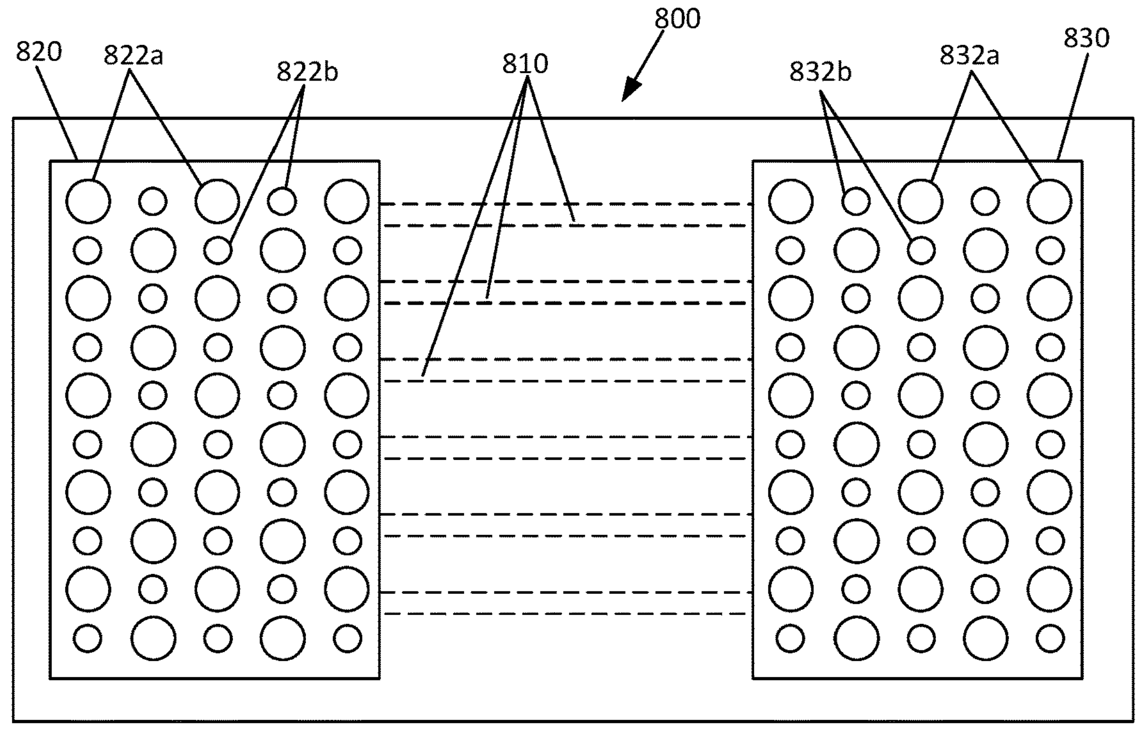
FIG. 8 illustrates a top view of another example printhead.

Referring now to FIG. 8, a top view of another example printhead 800 is illustrated. The example printhead 800 of FIG. 8 is provided with circulation channels 810 to flow fluid therethrough, a first nozzle array 820, and a second nozzle array 830. In the example printhead 800 of FIG. 8, each nozzle array 820, 830 is provided with both HDW nozzles 822*a*, 832*a* and LDW nozzles 822*b*, 832*b*. In particular, in the example of FIG. 8, each nozzle array is provided with substantially the same number of each type of nozzle. For example, the first nozzle array 820 includes substantially the same number of HDW nozzles 822*a* as LDW nozzles 822*b*, and the second nozzle array 830 includes substantially the same number of HDW nozzles 832*a* as LDW nozzles 832*b*. In this arrangement, fluid may be flowed in either direction through the circulation channels and provide print capability.

Regardless of flow direction, certain nozzles in each nozzle array 820, 830 can be activated dependent on the absolute pressure at the nozzle array 820, 830 to improve fluid flux and print quality. For example, with fluid flowing from left to right and the first nozzle array 820 at the higher absolute pressure location, all nozzles 822*a*, 822*b* in the first nozzle array may be ejecting fluid. At the same time, with the second nozzle array 830 in the lower absolute pressure location, only the LDW nozzles 832*b* may be ejecting fluid. The same result is produced with the flow reversed, but with the second nozzle array 830 being at the higher absolute pressure and the first nozzle array 820 at the lower absolute pressure.

Figure 9:
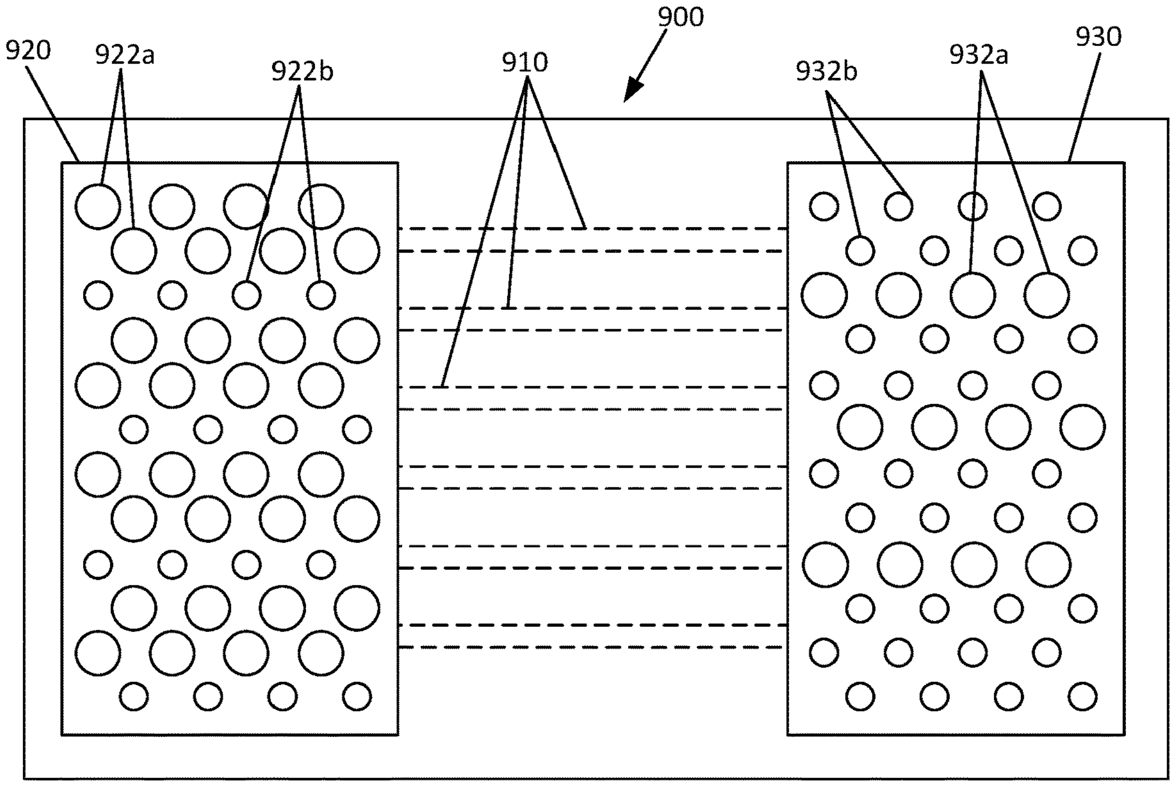
FIG. 9 illustrates a top view of another example printhead.

While FIG. 8 illustrates an example printhead 800 with substantially the same number of HDW and LDW nozzles in each nozzle array, FIG. 9 illustrates an example printhead 900 in which each nozzle array has a different number of each type of nozzle. FIG. 9 illustrates the example printhead 900 with circulation channels 910, a first nozzle array 920 and a second nozzle array 930. The first nozzle array 920 is provided with both HDW nozzles 922*a* and LDW nozzles 922*b*. Similarly, the second nozzle array 930 is also provided both HDW nozzles 932*a* and LDW nozzles 932*b*. In the example printhead 900 of FIG. 9, the number of HDW nozzles 922*a* in the first nozzle array 920 is greater than the number of HDW nozzles 932*a* in the second nozzle array 930. Conversely, the number of LDW nozzles 932*b* in the second nozzle array 930 is greater than the number of LDW nozzles 922*b* in the first nozzle array 920.

Further, within each nozzle array 920, 930, the number of one type of nozzle is greater than the other type of nozzle. For example, within the first nozzle array 920, the number of HDW nozzles 922*a* is greater than the number of LDW nozzles 922*b*, and within the second nozzle array 930, the number of LDW nozzles 932*b* is greater than the number of HDW nozzles 932*a*. The distribution of the two types of nozzles in each array may vary in different examples. For example, one nozzle array may include between 50 percent and 80 percent of one type of nozzle, with the other nozzle having between 50 percent and 80 percent of the second type of nozzle.

In the example illustrated in FIG. 9, the flow of the fluid through the circulation channels 910 may be in either direction. In one example, the fluid may be flowed from left to right in FIG. 9. In this regard, the first nozzle array 920 with more HDW nozzles 922*a* than LDW nozzles 922*b* is provided at a position corresponding to a higher absolute pressure in the circulation channels 910, while the second nozzle array 930 with more LDW nozzles 932*b* than HDW nozzles 932*a* is provided at a position corresponding to the lower absolute pressure in the circulation channels. Flow of the fluid in this direction may be used to improve the flow of the fluid through the nozzles, which may be desired for a first print quality when HDW print flux is greater than LDW print flux demand (e.g., faster, higher-quality print).

In another example, the fluid may be flowed from right to left in FIG. 9. In this regard, the first nozzle array 920 with more HDW nozzles is provided at a position corresponding to a lower absolute pressure in the circulation channels 910, while the second nozzle array 930 with more LDW nozzles is provided at a position corresponding to the higher absolute pressure in the circulation channels. In these positions, flow through the second nozzle array 930 (with more LDW nozzles) may be increased, while decreasing flow through the first nozzle array 920 (with more HDW nozzles). Flow of the fluid in this direction may be used to provide higher print quality when LDW print flux is greater than HDW print flux demand.

Figure 10:
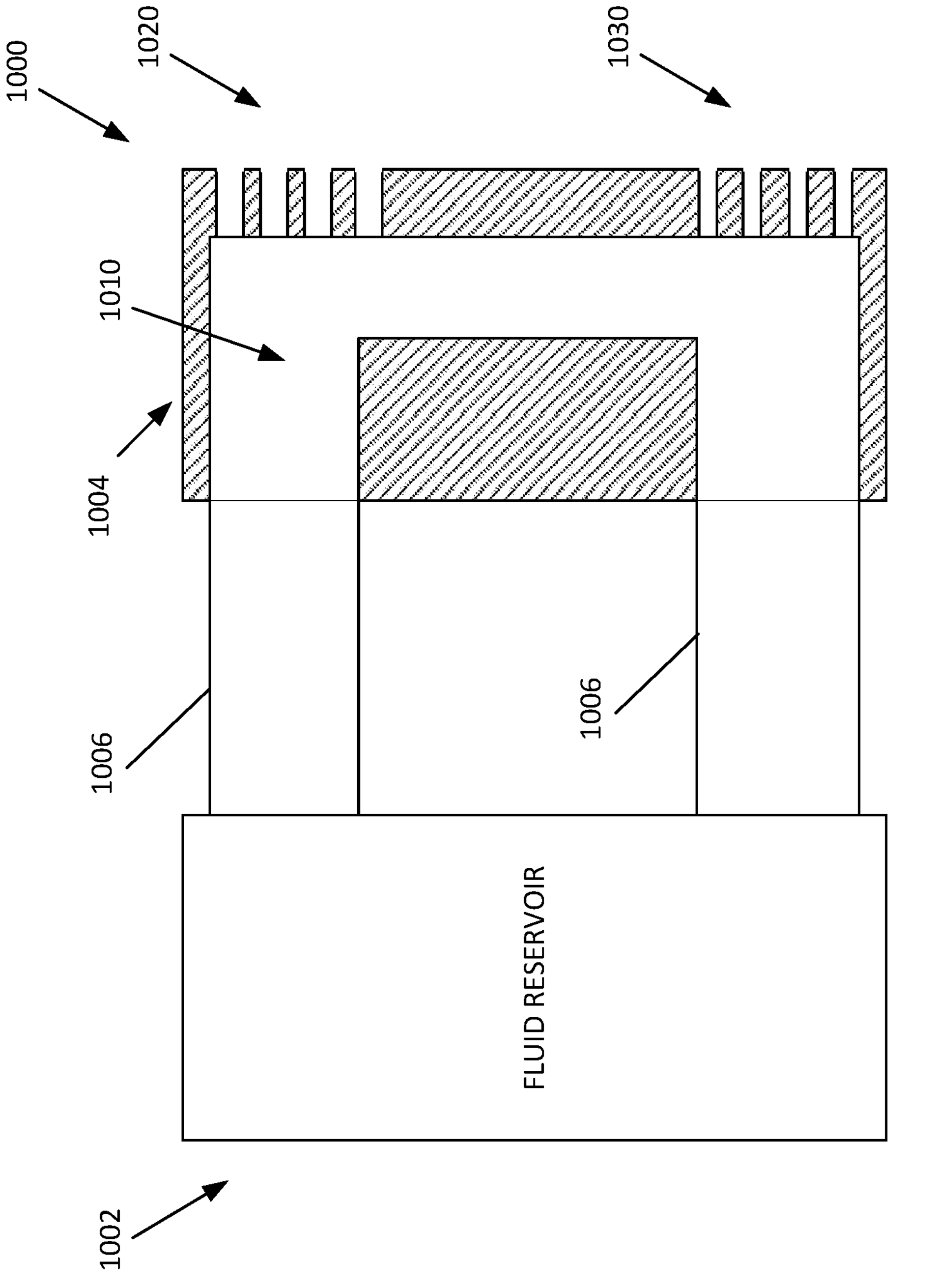
FIG. 10 illustrates an example apparatus with an example printhead.

Referring now to FIG. 10, an example apparatus with an example printhead is illustrated. The example apparatus 1000 includes a fluid reservoir 1002 and a printhead 1004. The fluid reservoir 1002 may be a replaceable or refillable fluid tank and is coupled to the printhead 1004. The printhead 1004 is provided with a circulation channel 1010 which is coupled to the fluid reservoir 1002 through coupling channels 1006. The printhead 1004 may be similar to the printheads described above with reference to FIGS. 1-9. In this regard, in addition to the circulation channel 1010, the printhead 1004 includes a first nozzle array 1020 and a second nozzle array 1030. Each nozzle array 1020, 1030 may be provided with different types of nozzle, such as HDW nozzles and LDW nozzles.

Thus, in accordance with the examples described above, various printheads may take advantage of the varying absolute pressure within the circulation channel and provide improved fluid flow through the nozzles.

It is noted that the foregoing description uses terms like "and/or," "at least," "one or more," and other like open-ended terms in an abundance of caution. However, this is done without limitation. And unless expressly stated otherwise, singular terms (e.g., "a," "an," or "one" component) are not intended to restrict to only the singular case but are intended to encompass plural cases as well. Similarly, "or" is intended to be open-ended, unless stated otherwise, such that "A or B" may refer to A only, B only, and A and B.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A printhead, comprising:
a circulation channel having an inlet for receiving a fluid and an outlet for expelling the fluid; and
a first nozzle fluidically coupled to the circulation channel, the first nozzle being operable at a first absolute pressure; and
a second nozzle fluidically coupled to the circulation channel, the second nozzle being operable at a second absolute pressure, the absolute second pressure being lower than the first absolute pressure,
wherein the absolute pressure in the circulation channel decreases as the fluid flows from the inlet to the outlet, and
wherein the first nozzle is positioned closer to the inlet of the circulation channel than the second nozzle.

2. The printhead of claim 1, wherein the first nozzle has a first exit area and the second nozzle has a second exit area, wherein the first exit area is larger than the second exit area.

3. The printhead of claim 1, wherein the fluid is ejected from the first nozzle at a greater flow rate than the second nozzle.

4. The printhead of claim 1, wherein the first nozzle is part of a first nozzle array coupled to the circulation channel and the second nozzle is part of a second nozzle array coupled to the circulation channel,
wherein each nozzle in the first nozzle array is operable at the first absolute pressure, and
wherein each nozzle in the second nozzle array is operable at the second absolute pressure.

5. The apparatus of claim 1, wherein the fluid is ejected from the high drop weight nozzles at a greater flow rate than the low drop weight nozzles.

6. An apparatus, comprising:
a fluid reservoir; and
a printhead, the printhead comprising:
a circulation channel coupled to the fluid reservoir, the circulation channel being to flow a fluid therethrough; and
a first nozzle array fluidically coupled to the circulation channel, the first nozzle array having a first set of nozzles; and
a second nozzle array fluidically coupled to the circulation channel, the second nozzle having a second set of nozzles,
wherein the first set of nozzles includes more high drop weight nozzles than the second set of nozzles,
wherein the second set of nozzles includes more low drop weight nozzles than the first set of nozzles, and
wherein an exit area of the high drop weight nozzles is greater than the exit area of the low drop weight nozzles.

7. The apparatus of claim 6, wherein the first set of nozzles are arranged along chevrons formed in the first nozzle array and the second set of nozzles are arranged along chevrons formed in the second nozzle array.

8. The apparatus of claim 6, wherein the first set of nozzles and the second set of nozzles are arranged along chevrons, each chevron being formed across the first nozzle array and the second nozzle array.

9. The apparatus of claim 6, wherein the high drop weight nozzles are operable at a first absolute pressure and the low drop weight nozzles are operable at a second absolute pressure, the first absolute pressure being greater than the second absolute pressure.

10. The apparatus of claim 6, wherein the first nozzle array is positioned upstream along the circulation channel from the second nozzle array.

11. The apparatus of claim 6, wherein the fluid is flowed in a first direction through the circulation channel for a first print quality and in a second direction for a second print quality, the second direction being opposite the first direction.

12. A fluidic die, comprising:
a circulation channel to flow a fluid therethrough; and
a first nozzle array fluidically coupled to the circulation channel, the first nozzle array having a first set of nozzles; and
a second nozzle array fluidically coupled to the circulation channel, the second nozzle having a second set of nozzles,
wherein the first set of nozzles and the second set of nozzles each include high drop weight nozzles and low drop weight nozzles, and
wherein an exit area of the high drop weight nozzles is greater than the exit area of the low drop weight nozzles.

13. The fluidic die of claim 12, wherein the first nozzle array includes substantially same number of high drop weight nozzles as the second nozzle array, and wherein the first nozzle array includes substantially same number of low drop weight nozzles as the second nozzle array.

14. The fluidic die of claim 12, wherein the first nozzle array includes a greater number of high drop weight nozzles than the second nozzle array, and wherein the second nozzle array includes a greater number of low drop weight nozzles than the first nozzle array.

15. The fluidic die of claim 12, wherein the high drop weight nozzles are operable at a first absolute pressure and the low drop weight nozzles are operable at a second absolute pressure, the first absolute pressure being greater than the second absolute pressure.

* * * * *